US012727046B2

(12) United States Patent
Zhu

(10) Patent No.: US 12,727,046 B2
(45) Date of Patent: Sep. 1, 2026

(54) METHOD FOR EXTENDED DRX

(71) Applicant: ZTE CORPORATION, Shenzhen (CN)

(72) Inventor: Jinguo Zhu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 320 days.

(21) Appl. No.: 18/424,959

(22) Filed: Jan. 29, 2024

(65) Prior Publication Data

US 2024/0251474 A1 Jul. 25, 2024

Related U.S. Application Data

(63) Continuation of application No. PCT/CN2022/082004, filed on Mar. 21, 2022.

(51) Int. Cl.

| | |
|---|---|
| ***H04W 76/19*** | (2018.01) |
| ***H04W 48/16*** | (2009.01) |
| ***H04W 76/27*** | (2018.01) |
| ***H04W 76/28*** | (2018.01) |
| *H04W 8/08* | (2009.01) |
| *H04W 76/20* | (2018.01) |

(52) U.S. Cl.

CPC .......... *H04W 76/19* (2018.02); *H04W 48/16* (2013.01); *H04W 76/27* (2018.02); *H04W 76/28* (2018.02); *H04W 8/08* (2013.01); *H04W 76/20* (2018.02)

(58) Field of Classification Search

CPC ..... H04W 76/28; H04W 48/16; H04W 76/27; H04W 76/19; H04W 28/14; H04W 52/0216; H04W 8/08; H04W 76/20; Y02D 30/70

See application file for complete search history.

(56) References Cited

U.S. PATENT DOCUMENTS

| | | | | |
|---|---|---|---|---|
| 2021/0105866 | A1* | 4/2021 | Kavuri | H04W 76/27 |
| 2021/0219264 | A1* | 7/2021 | Chen | H04W 76/27 |
| 2022/0078872 | A1 | 3/2022 | Shrestha et al. | |
| 2022/0174775 | A1* | 6/2022 | Rönneke | H04W 76/27 |

(Continued)

FOREIGN PATENT DOCUMENTS

| | | | |
|---|---|---|---|
| CN | 110913505 | A | 3/2020 |
| CN | 111226449 | A | 6/2020 |

(Continued)

OTHER PUBLICATIONS

Telecommunications Tech Res Inst, "Downlink data caching method, network equipment and UPF entity", Mar. 4, 2020, CN CN-110913505-A (Year: 2020).*

(Continued)

*Primary Examiner* — Michael K Phillips

(74) *Attorney, Agent, or Firm* — Foley & Lardner LLP

(57) ABSTRACT

Method, device and computer program product for wireless communication are provided. A method includes: receiving, by a wireless communication node from a user plane function, downlink data directed to a wireless communication terminal during an unreachable time of the wireless communication terminal; and transmitting, by the wireless communication node to an access and mobility management function, a suspend request comprising a first indication to enable the downlink data to be buffered in the user plane function.

16 Claims, 8 Drawing Sheets receiving, by a wireless communication node from a user plane function , downlink data directed to a wireless communication terminal during an unreachable time of the wireless communication terminal transmitting, by the wireless communication node to an access and mobility management function , a suspend request comprising a first indication to enable the downlink data to be buffered in the user plane function

(56) References Cited

U.S. PATENT DOCUMENTS

| | | | | |
|---|---|---|---|---|
| 2023/0232488 A1* | 7/2023 | Van Phan | ............ | H04W 76/27 370/328 |
| 2024/0179792 A1* | 5/2024 | Höglund | .............. | H04W 76/28 |

FOREIGN PATENT DOCUMENTS

| | | |
|---|---|---|
| WO | WO-2019/193184 A1 | 10/2019 |
| WO | WO-2020/194171 A1 | 10/2020 |

OTHER PUBLICATIONS

Launay, "NG-RAN Network—Functional Architecture", 2021, Wiley (Year: 2021).*

3rd Generation Partnership Project; Technical Specification Group Services and System Aspects; Study on support of reduced capability NR devices; Phase 2 (Release 18), 3GPP TR23.700-68 V0.1.0 (Feb. 2022), 22 pages.

Extended European Search Report for EP Appl. No. 22932544.4, dated Jan. 23, 2025 (8 pages).

Ericsson, "KI3 HLCOM Solution 24 update and evaluation", SA WG2 Meeting #128BIS, S2-188435, Aug. 24, 2018, Sophia Antipolis, France (14 pages).

Ericsson, "KI3: Solution for High latency communication", SA WG2 Meeting #127, S2-183217, Apr. 20, 2018, Sanya, China (12 pages).

International Search Report and Written Opinion for PCT Appl. No. PCT/CN2022/082004 mailed Nov. 28, 2022, (7 pages).

Qualcomm, "CM-IDLE with RRC inactive procedures", SA WG2 Meeting #146E e-meeting, S2-2106400, Aug. 27, 2021, Elbonia (15 pages).

Sony, "Solution proposal long eDRX for RedCap devices", SA WG2 Meeting #149E (E-meeting), S2-2200671, Feb. 25, 2022, Elbonia (6 pages).

* cited by examiner

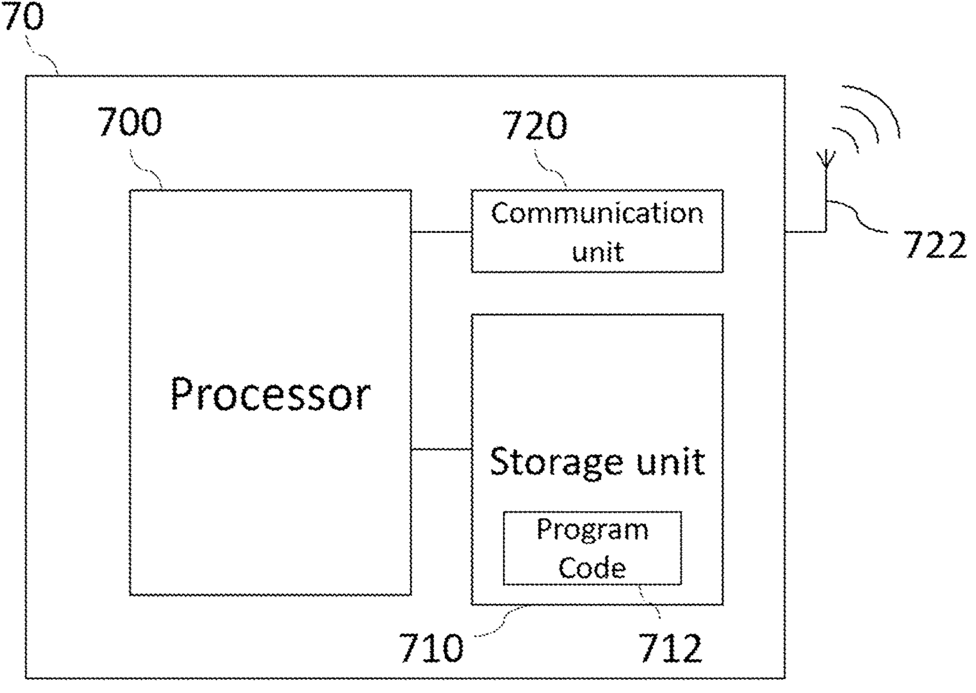

FIG. 7 receiving, by a wireless communication node from a user plane function, downlink data directed to a wireless communication terminal during an unreachable time of the wireless communication terminal

↓ transmitting, by the wireless communication node to an access and mobility management function, a suspend request comprising a first indication to enable the downlink data to be buffered in the user plane function

FIG. 8 receiving, by an access and mobility management function from a wireless communication node , a suspend request comprising a first indication to enable downlink data transmitted to a wireless communication terminal to be buffered in the user plane function

FIG. 9 receiving, by a wireless communication node from an access and mobility management function, a request for transmitting a downlink non-access stratum, NAS, message to a wireless communication terminal during an unreachable time of the wireless communication terminal transmitting, by the wireless communication node to the access and mobility management function, a reject message with a cause value indicating that the wireless communication terminal is temporarily unreachable

FIG. 10 transmitting, by an access and mobility management function to a wireless communication node, a request for transmitting a downlink non-access stratum, NAS, message to a wireless communication terminal receiving, by the access and mobility management function from the wireless communication node, a reject message with a cause value indicating that the wireless communication terminal is temporarily unreachable

FIG. 11

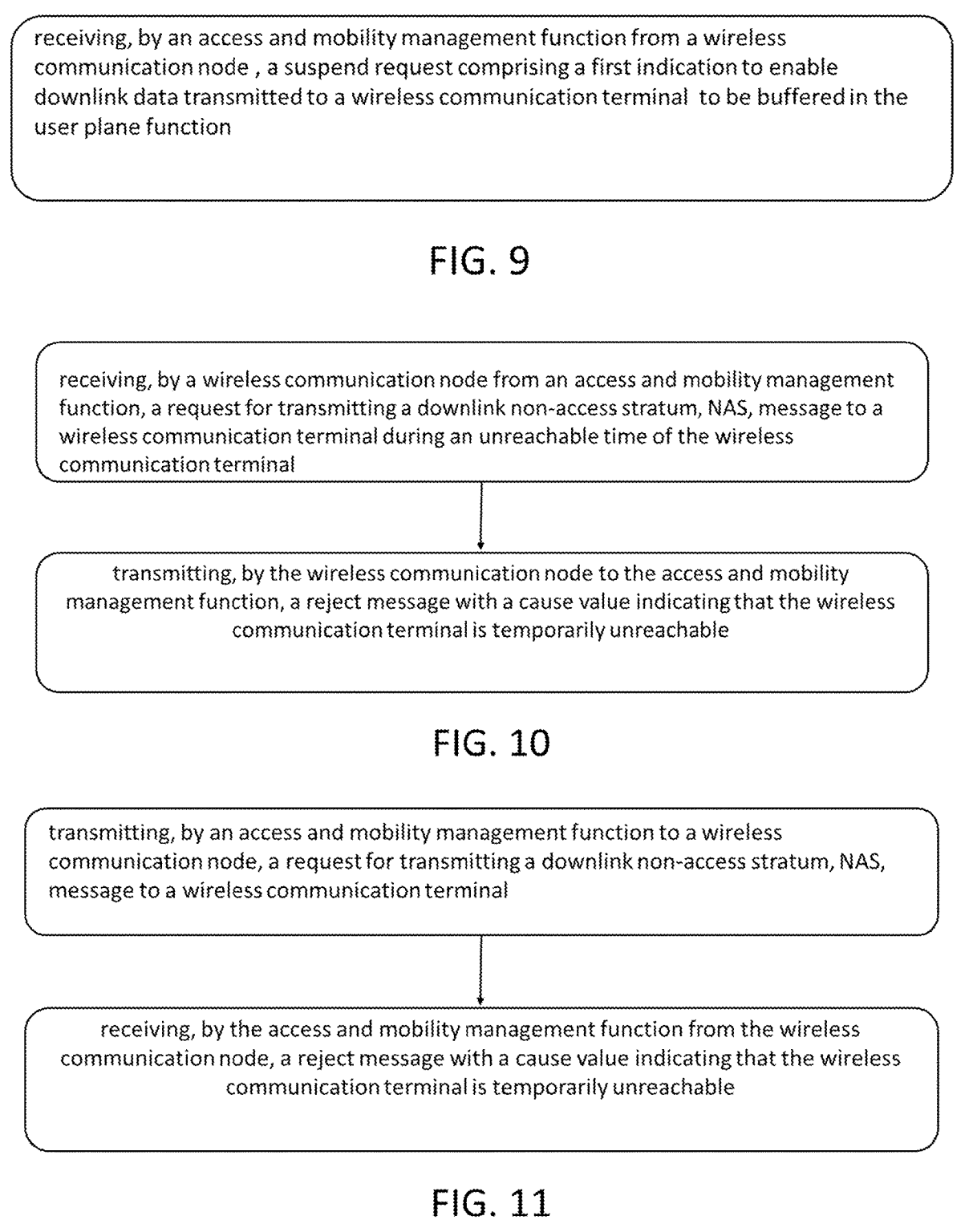

METHOD FOR EXTENDED DRX

CROSS-REFERENCE TO RELATED PATENT APPLICATIONS

This application is a Continuation of PCT Application No. PCT/CN2022/082004, filed Mar. 31, 2022, incorporated herein by reference in its entirety.

TECHNICAL FIELD

This document is directed generally to wireless communications, and in particular to 5th generation (5G) communications.

BACKGROUND

CM-CONNECTED with RRC (Radio Resource Control) Inactive state is a state where the N1 NAS signaling connection, N2 control plane connection and N3 user plane connection are maintained while the RRC connection is suspended. The last serving NG-RAN (Next Generation-Radio Access Network) node keeps the UE (user equipment) context and the UE-associated NG connection with the serving AMF (N2 control plane connection) and UPF (N3 user plane connection). The UE can move within an area configured by NG-RAN (RNA: RAN-based Notification Area) without notifying NG-RAN.

SUMMARY

Extended Discontinuous reception (eDRX) is a way for a user equipment (UE) to save energy. eDRX forces a UE to turn off its transceivers for a DRX cycle and starts to receive paging within the Paging Time Window. In CM-CONNECTED with RRC Inactive state, the UE applies either the DRX cycle negotiated with AMF, or the DRX cycle broadcast by RAN or the UE specific DRX cycle configured by RAN. If the NG-RAN receives downlink data from the UPF or downlink N2 signalling from the AMF while the UE is in CM-CONNECTED with RRC Inactive state, and if the NG-RAN determines that DRX is applied for the UE, the NG-RAN buffers the DL data or DL N2 signaling and pages the UE when the NG-RAN determines the UE is in Paging Time Window.

When the DRX is applied for CM-CONNECTED with RRC Inactive state, in order to further reduce the UE power energy, the DRX cycle may be extended longer than 10.24 s. This will cause two issues:

The NG-RAN buffers the downlink data when the UE is in CM-CONNECTED with RRC Inactive state. If the DRX cycle value is larger than 10.24 s, the buffered downlink data in NG-RAN may overflow.

The AMF sends N1 NAS message to the UE via NG-RAN. Since the UE is not reachable for DRX cycle and if the DRX cycle value is larger than 10.24 s, the NAS message retransmission timer in the AMF (Access and Mobility Management Function) may be expired and this will trigger the AMF to mark the UE unreachable.

One aspect of the present disclosure relates to a wireless communication method. In an embodiment, the wireless communication method includes: receiving, by a wireless communication node from a user plane function, downlink data directed to a wireless communication terminal during an unreachable time of the wireless communication terminal; and transmitting, by the wireless communication node to an access and mobility management function, a suspend request comprising a first indication to enable the downlink data to be buffered in the user plane function.

Another aspect of the present disclosure relates to a wireless communication method. In an embodiment, the wireless communication method includes: receiving, by an access and mobility management function from a wireless communication node, a suspend request comprising a first indication to enable downlink data transmitted to a wireless communication terminal to be buffered in the user plane function.

Another aspect of the present disclosure relates to a wireless communication method. In an embodiment, the wireless communication method includes: receiving, by a wireless communication node from an access and mobility management function, a request for transmitting a downlink non-access stratum, NAS, message to a wireless communication terminal during an unreachable time of the wireless communication terminal; and transmitting, by the wireless communication node to the access and mobility management function, a reject message with a cause value indicating that the wireless communication terminal is temporarily unreachable.

Another aspect of the present disclosure relates to a wireless communication method. In an embodiment, the wireless communication method includes: transmitting, by an access and mobility management function to a wireless communication node, a request for transmitting a downlink non-access stratum, NAS, message to a wireless communication terminal; and receiving, by the access and mobility management function from the wireless communication node, a reject message with a cause value indicating that the wireless communication terminal is temporarily unreachable.

Another aspect of the present disclosure relates to a wireless communication node. In an embodiment, the wireless communication terminal includes a communication unit and a processor. The processor is configured to: receive, by the communication unit from a user plane function, downlink data directed to a wireless communication terminal during an unreachable time of the wireless communication terminal; and transmit, by the communication unit to an access and mobility management function, a suspend request comprising a first indication to enable the downlink data to be buffered in the user plane function.

Another aspect of the present disclosure relates to a wireless communication node. In an embodiment, the wireless communication node includes a communication unit and a processor. The processor is configured to: receive, by the communication unit from a wireless communication node, a suspend request comprising a first indication to enable downlink data transmitted to a wireless communication terminal to be buffered in the user plane function.

Another aspect of the present disclosure relates to a wireless communication node. In an embodiment, the wireless communication terminal includes a communication unit and a processor. The processor is configured to: receive, by the communication unit from an access and mobility management function, a request for transmitting a downlink non-access stratum, NAS, message to a wireless communication terminal during an unreachable time of the wireless communication terminal; and transmit, by the communication unit to the access and mobility management function, a reject message with a cause value indicating that the wireless communication terminal is temporarily unreachable.

Another aspect of the present disclosure relates to a wireless communication node. In an embodiment, the wireless communication node includes a communication unit and a processor. The processor is configured to: transmit, by the communication unit to a wireless communication node, a request for transmitting a downlink non-access stratum, NAS, message to a wireless communication terminal; and receive, by the communication unit from the wireless communication node, a reject message with a cause value indicating that the wireless communication terminal is temporarily unreachable.

Various embodiments may preferably implement the following features:

Preferably or in some embodiments, the method comprises: receiving, by the wireless communication node, an extended discontinuous reception, eDRX, cycle value in a radio resource control, RRC, inactive state from the access and mobility management function; and setting, by the wireless communication node, an unreachable time of the wireless communication terminal according to the eDRX cycle value in the RRC inactive state.

Preferably or in some embodiments, the method comprises: buffering, by the wireless communication node, the downlink data in the wireless communication node.

Preferably or in some embodiments, the wireless communication node transmits the suspend request in response to the wireless communication node determining that a buffer of the wireless communication node is full.

Preferably or in some embodiments, the suspend request requests the access and mobility management function to keep the wireless communication terminal in a connection management, CM, CONNECTED state.

Preferably or in some embodiments, the method comprises: transmitting, by the wireless communication node to the wireless communication terminal, the buffered downlink data from the user plane function in response to the wireless communication terminal resuming from the eDRX idle state.

Preferably or in some embodiments, the method comprises: transmitting, by the wireless communication node to the access and mobility management function, a resume request comprising a second indication to enable a transferring of the downlink data over an interface between the user plane function and the wireless communication node.

Preferably or in some embodiments, the method comprises: transmitting, by the access and mobility management function to the wireless communication node, an extended discontinuous reception, eDRX, cycle value in a radio resource control, RRC, inactive state to allow the wireless communication node to set an unreachable time of the wireless communication terminal according to the eDRX cycle value in the RRC inactive state.

Preferably or in some embodiments, the method comprises: transmitting, by the access and mobility management function to a session management function, a request for enabling the downlink data to be buffered in the user plane function in response to the first indication.

Preferably or in some embodiments, the method comprises: receiving, by the access and mobility management function from the wireless communication node, a resume request comprising a second indication to enable a transferring of the downlink data over an interface between the user plane function and the wireless communication node.

Preferably or in some embodiments, the method comprises: transmitting, by the access and mobility management function to a session management function, a request for enabling the transferring of the downlink data in response to the second indication.

Preferably or in some embodiments, the method comprises: transmitting, by the wireless communication node to the access and mobility management function, an expected waiting time for reaching the wireless communication terminal according to a remaining unreachable time.

Preferably or in some embodiments, the method comprises: transmitting, by the wireless communication node to the access and mobility management function, a message indicating the wireless communication terminal is reachable in response to a resume request being received from the wireless communication terminal.

Preferably or in some embodiments, the method comprises: transmitting, by the access and mobility management function to the wireless communication node, an extended discontinuous reception, eDRX, cycle value in a radio resource control, RRC, inactive state to allow the wireless communication node to set the unreachable time of the wireless communication terminal according to the eDRX cycle value in the RRC inactive state.

Preferably or in some embodiments, the method comprises: receiving, by the access and mobility management function from the wireless communication node, an expected waiting time for reaching the wireless communication terminal.

Preferably or in some embodiments, the method comprises: starting, by the access and mobility management function, a timer for retransmitting the request according to an expected waiting time received from the wireless communication node.

Preferably or in some embodiments, the method comprises: retransmitting, by the access and mobility management function to the wireless communication node, the request for transmitting the downlink NAS message to the wireless communication terminal in response to a timer associated to an expected waiting time received from the wireless communication node expiring.

Preferably or in some embodiments, the method comprises: retransmitting, by the access and mobility management function to the wireless communication node, the request for transmitting the downlink NAS message to the wireless communication terminal in response to receiving a message from the wireless communication node indicating the wireless communication terminal is reachable.

The present disclosure relates to a computer program product comprising a computer-readable program medium code stored thereupon, the code, when executed by a processor, causing the processor to implement a wireless communication method recited in any one of foregoing methods.

The example embodiments disclosed herein are directed to providing features that will become readily apparent by reference to the following description when taken in conjunction with the accompany drawings. In accordance with various embodiments, example systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the example embodiments and applications described and illustrated herein. Additionally, the specific order and/or hierarchy of steps in the methods disclosed herein are merely example approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

BRIEF DESCRIPTION OF THE DRAWINGS

FIG. 7 shows an example of a schematic diagram of a wireless network node according to an embodiment of the present disclosure.

FIGS. 8 to 11 show flowcharts of methods according to some embodiments of the present disclosure.

DETAILED DESCRIPTION

Figure 1:
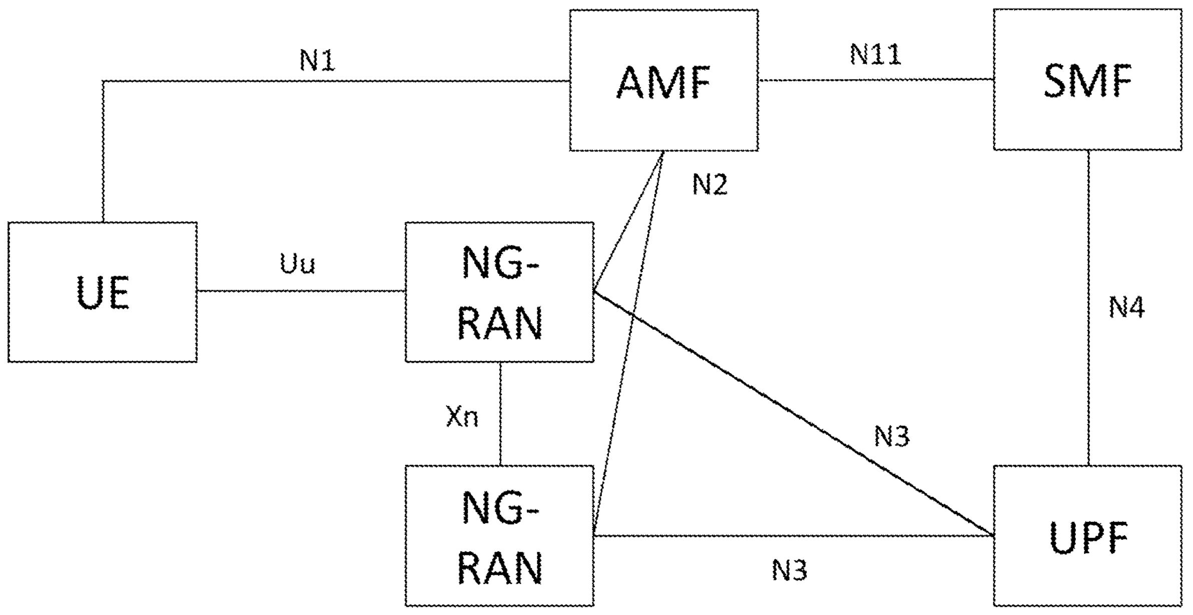
FIG. 1 shows a schematic diagram of a 5G system architecture according to an embodiment of the present disclosure.

FIG. 1 shows an architecture of a 5G system according to an embodiment of the present disclosure.

In this architecture, there are the following functions:

UE, User Equipment.

NG-RAN, Radio Access Network. This function includes the following Resource Management functionality: Radio Bearer Control, Radio Admission Control, Connection Mobility Control, Dynamic allocation of resources to UEs in both uplink and downlink (scheduling);

AMF, Access and Mobility Management function. This function includes the following functionalities: Registration management, Connection management, Reachability management and Mobility Management. This function also performs the access authentication and access authorization. The AMF is the NAS security termination and relay the SM NAS between UE and SMF, etc.

SMF, Session Management Function. This function includes the following functionalities: session establishment, modification and release, UE IP address allocation & management (including optional authorization functions), selection and control of UP function, downlink data notification, etc. The SMF controls the UPF via N4 association.

UPF, User plane function. This function includes the following functionalities: serving as an anchor point for intra-/inter-radio access technology (RAT) mobility, packet routing & forwarding, traffic usage reporting, QoS handling for the user plane, downlink packet buffering and downlink data notification triggering, etc.

Figure 2:
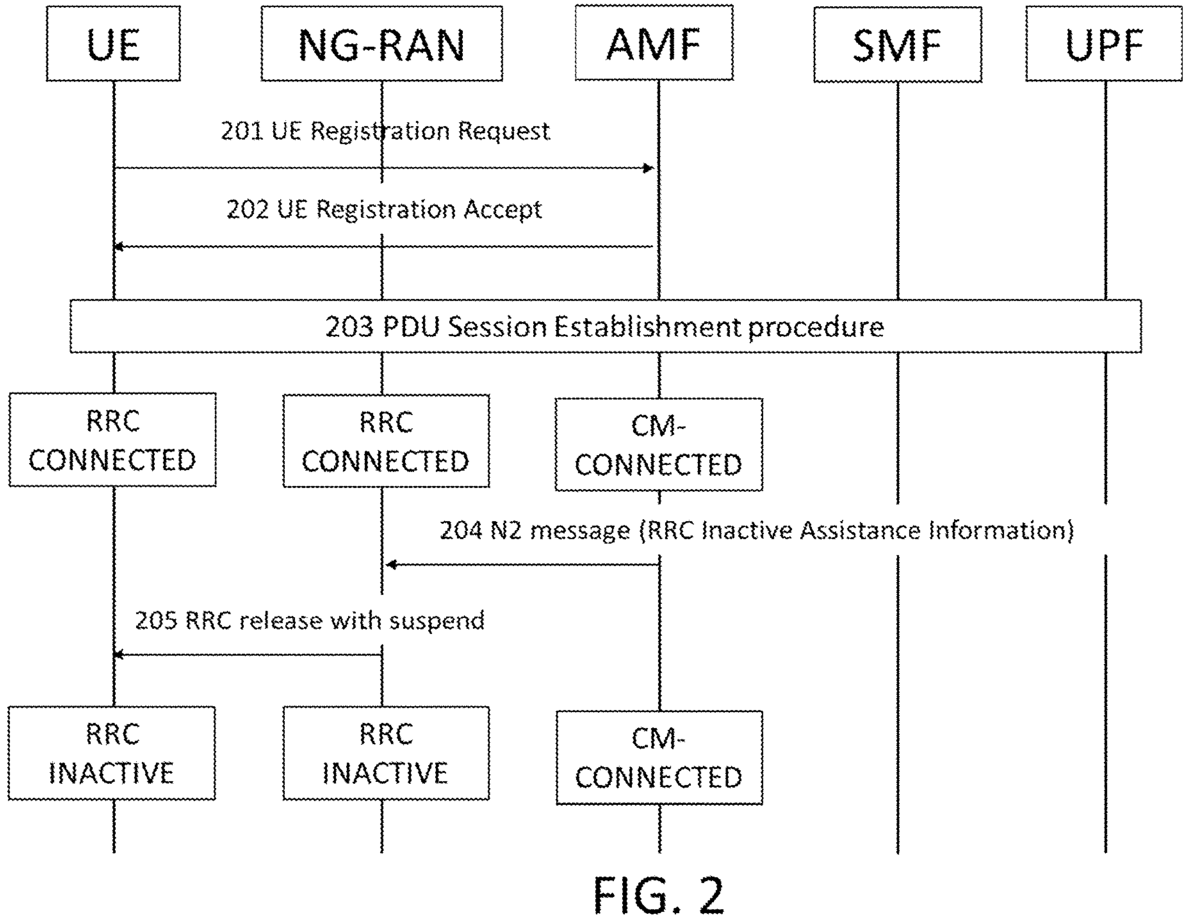
FIG. 2 shows a schematic diagram of applying a DRX cycle when the UE is in CM-CONNECTED with RRC Inactive state according to an embodiment of the present disclosure.

FIG. 2 shows a schematic diagram of applying a DRX cycle when the UE is in CM-CONNECTED with RRC Inactive state according to an embodiment of the present disclosure.

At 201, the UE sends a Registration Request to the AMF. If the UE decides to request for extended idle mode DRX, the UE includes an extended idle mode DRX parameters information element in the Registration Request message. The extended DRX parameters information element includes the extended idle mode DRX cycle length.

At 202, the AMF decides whether to accept or reject the UE request for enabling extended idle mode DRX. If the AMF accepts the extended idle mode DRX, the AMF, based on operator policies and, if available, the extended idle mode DRX cycle length value in the subscription data, may also provide different values of the extended idle mode DRX parameters than what was requested by the UE. The AMF takes into account the RAT specific Subscribed Paging Time Window, the UE's current RAT and local policy also assigns a Paging Time Window length to be used, and provides these values to the UE during Registration Update procedures together with the extended idle mode DRX cycle length in the extended DRX parameter information element. Based on the UE requested extended idle mode DRX cycle value, UE subscription or operator configuration, the accepted extended idle mode DRX cycle length value can be set above 10.24 s.

At 203, the UE may initiate a PDU Session Establishment procedure. After this procedure, the user plane connections are established between UE and NG-RAN and between NG-RAN and UPF. The UE can send or receive data via the user plane connections.

At 204, the AMF passes the UE's accepted extended idle mode eDRX cycle length value in "RRC Inactive Assistance Information" to NG-RAN.

At 205, if the UE supports RRC inactive state, based on its UE radio capabilities, NG-RAN sends RRC release with suspend and configures the UE with an eDRX cycle in RRC-INACTIVE up to the value for the UE's extended idle mode eDRX cycle as provided by the AMF in "RRC Inactive Assistance Information".

After this step, the UE enters RRC inactive state and eDRX cycle starts to be used in both UE and NG-RAN. The NG-RAN starts an eDRX timer to monitor whether the UE is reachable or not. The AMF is not notified by the NG-RAN on the RRC inactive state, so the UE state in the AMF is still in CM-CONNECTED. The N3 user plane connection between NG-RAN and UPF is maintained. The user plane connection between the UE and NG-RAN is suspended.

Figure 3:
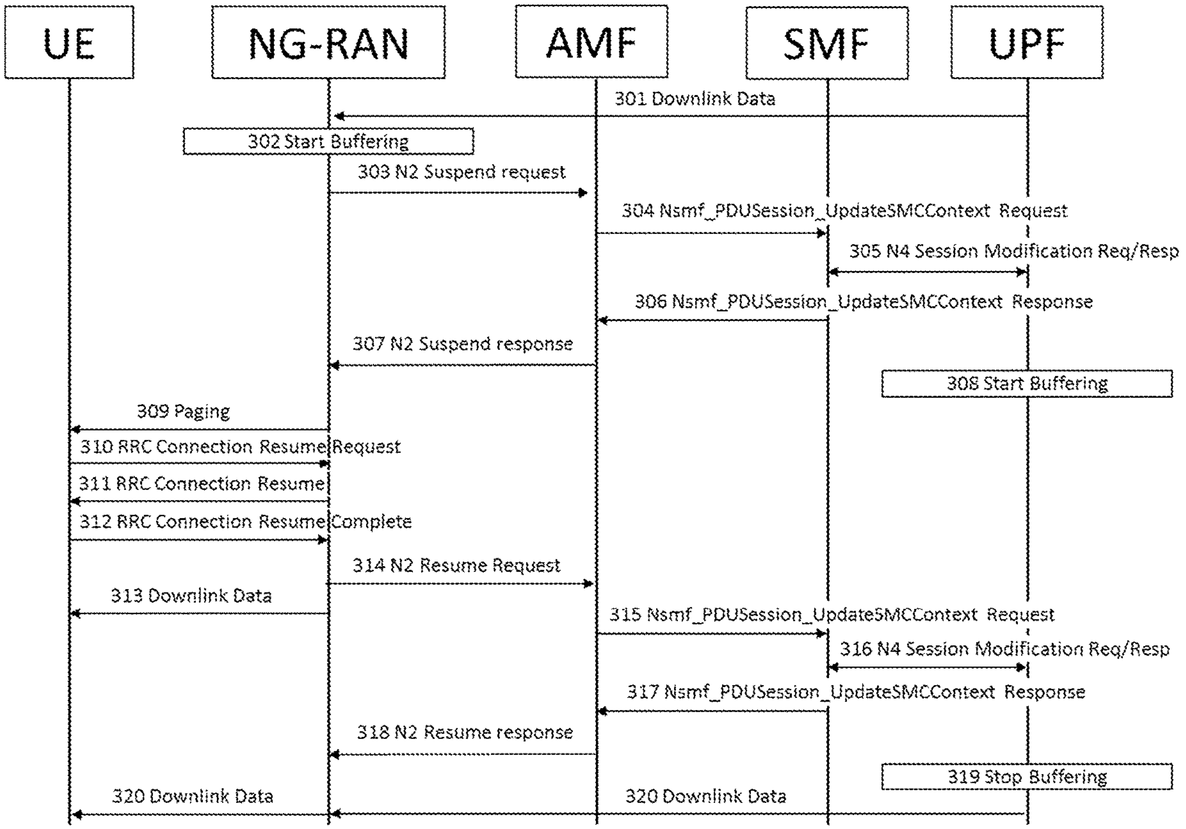
FIG. 3 shows a schematic diagram of handling downlink data after the UE enters RRC inactive state and eDRX cycle is applied according to an embodiment of the present disclosure.

FIG. 3 shows a schematic diagram of handling downlink data after the UE enters RRC inactive state and eDRX cycle is applied according to an embodiment of the present disclosure. FIG. 3 shows the following steps.

At 301, the Downlink data is sent to NG-RAN from the UPF over the N3 user plane connection.

At 302, since the NG-RAN knows the UE is in eDRX cycle and not reachable for paging, it starts to buffer the downlink data.

At 303, when further downlink data continues to arrive and the NG-RAN determines that the buffer will be overflown or is full, the NG-RAN sends an N2 Suspend Request to AMF, including an indication to enable the downlink data buffer in UPF and keep the UE in the CM-CONNECTED state.

At 304, the AMF sends a Nsmf_PDUSession_UpdateSMContext request to the SMF to enable downlink data buffering in the UPF.

At 305, the SMF sends an N4 Session Modification procedure to enable the downlink data buffering in UPF. The UPF starts to buffer further downlink data while still keeping the N3 tunnel towards the NG-RAN, i.e., the UPF doesn't remove the N3 GTP-U tunnel endpoint identity in NG-RAN At 306, the SMF sends an Nsmf_PDUSession_UpdateSMContext Response to AMF.

At 307, the AMF sends an N2 Suspend Response to the NG-RAN.

At 308, after step 305, the UPF starts to buffer further downlink data.

At 309, when the eDRX timer expires, the NG-RAN determines that the UE is reachable again. The NG-RAN sends a paging request in all the cells of the RNA (RAN Notification Area).

When the UE receives paging request, it sends an RRC Connection Resume request to the NG-RAN to resume the RRC connection at step 310.

At 311, the NG-RAN sends an RRC Connection Resume to the UE to resume the RRC connection.

The UE sends an RRC Connection Resume Complete to the NG-RAN in step 312. After this step, the RRC connection between the UE and NG-RAN is resumed.

At 313, the NG-RAN sends the buffered downlink data to the UE via the user plane connection between UE and NG-RAN.

If the NG-RAN has sent an N2 Suspend Request to the AMF in step 303, it sends an N2 Resume Request to the AMF to enable the downlink data transfer over N3 user plane connection (step 314).

At 315, the AMF sends an Nsmf_PDUSession_UpdateSMContext request to the SMF to enable downlink data transferring in the UPF.

At 316, the SMF sends an N4 Session Modification procedure to enable the downlink data transferring in the UPF.

The SMF sends an Nsmf_PDUSession_UpdateSMContext Response to the AMF in step 317.

The AMF sends an N2 Suspend Response to the NG-RAN in step 318.

At 319, the UPF stops the downlink data buffering.

At 320, the UPF sends the buffered downlink data and further received downlink data towards the NG-RAN via the N3 user plane connection between the NG-RAN and UPF.

Alternatively, after step 312, the NG-RAN may send some uplink packets to the UPF via the N3 user plane connection, which triggers the UPF to stop the downlink data buffering and sends the buffered and further received downlink data towards the NG-RAN via the user plane connection, and then steps 314-320 are skipped.

If the NG-RAN has enough buffer, steps 303-308 are not performed and steps 314-320 are also skipped.

When the UE has uplink data or an uplink message within the eDRX cycle, the UE resumes the RRC connection starting from step 310. The NG-RAN stops the eDRX timer.

Figure 4:
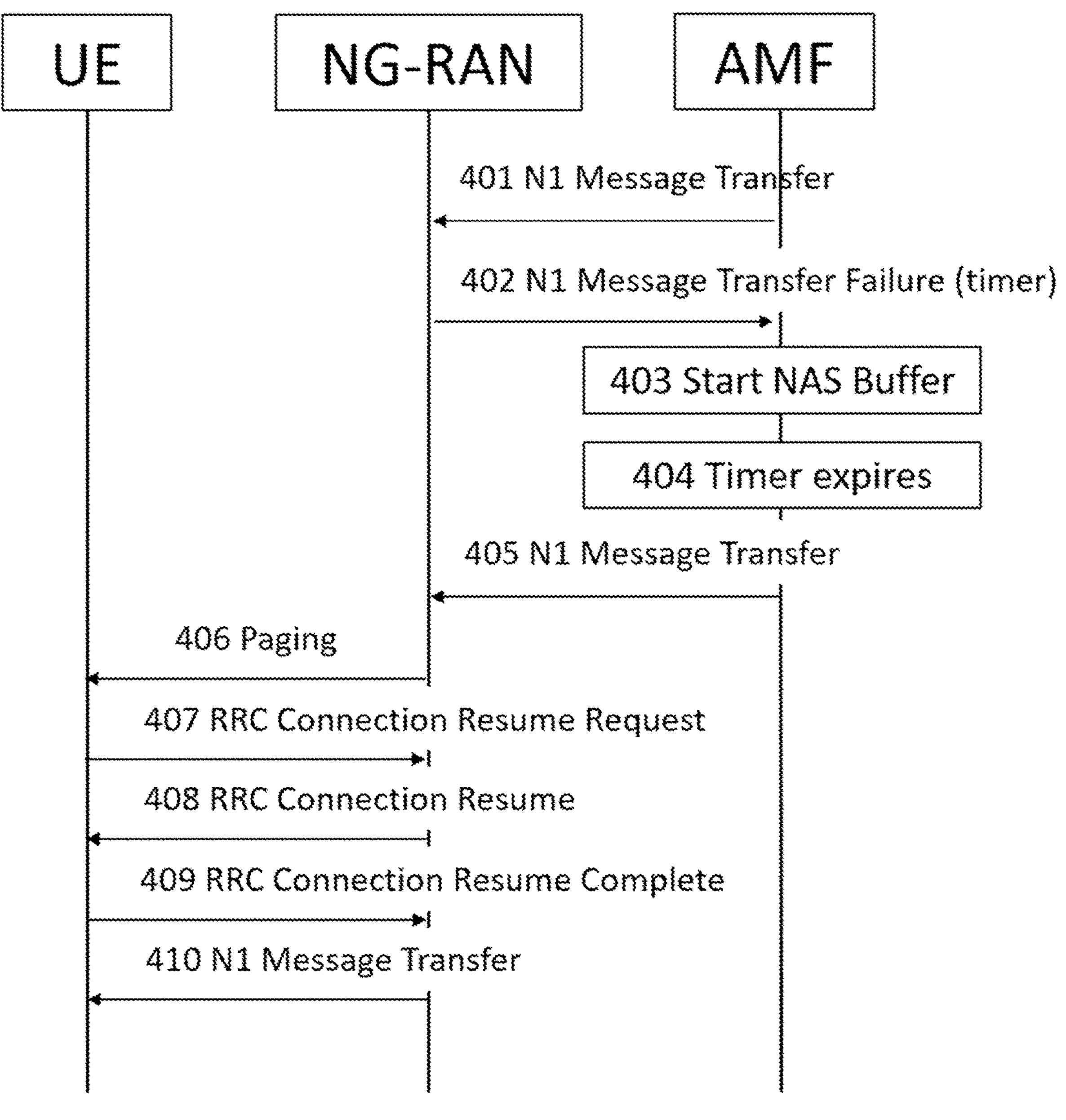
FIG. 4 shows a schematic diagram of handling the downlink NAS signaling after the UE enters RRC inactive state and DRX cycle is applied according to an embodiment of the present disclosure.

FIG. 4 shows a schematic diagram of handling the downlink NAS signaling after the UE enters RRC inactive state and DRX cycle is applied according to an embodiment of the present disclosure.

At 401, the AMF determines to send an N1 NAS message to the UE, so it sends an N1 Message Transfer to the NG-RAN.

At 402, since the NG-RAN knows the UE is in eDRX cycle and based on the remaining unreachable time, the UE is not reachable before the NAS retransmission timer expires, the NG-RAN rejects the N1 Message Transfer, with a cause value indicating that the UE is temporarily not reachable. The NG-RAN may also include an Expected Waiting Time in the rejection message.

Based on implementation the AMF may buffer the N1 message and a further N1 message (step 403), or rejects the request which triggers the N1 message.

At 404, the AMF starts a timer according to the received Expected Waiting Time from NG-RAN. Before the timer expires the AMF does not try to deliver any further N1 message to the NG-RAN.

When the timer expires, and if the AMF have buffered the N1 message or receives further N1 message, it sends an N1 Message Transfer to the NG-RAN at step 405.

At 406, the NG-RAN determines that the UE is reachable and it sends a Paging request in the RNA (RAN Notification Area)

When the UE receives the paging request, it sends an RRC Connection Resume request to the NG-RAN to resume the RRC connection at 407.

At 408, the NG-RAN sends an RRC Connection Resume to the UE.

At 409, the UE sends an RRC Connection Resume Complete to the NG-RAN. After this step, the RRC connection between the UE and NG-RAN is resumed.

At 410, the NG-RAN sends the N1 message to the UE over the RRC connection.

Figure 5:
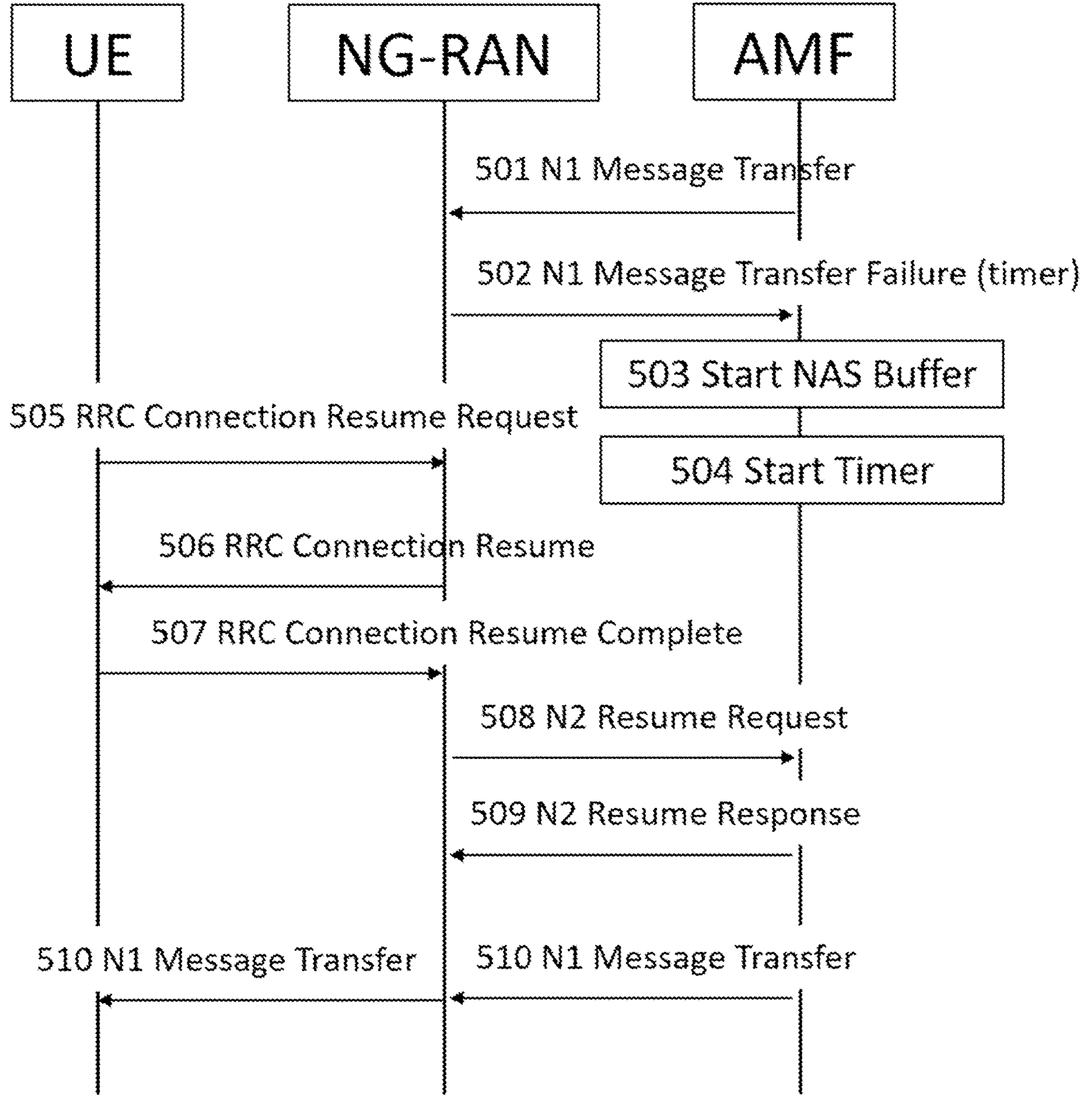
FIG. 5 shows a schematic diagram of handling the downlink NAS signaling after the UE enters RRC inactive state and DRX cycle is applied according to an embodiment of the present disclosure.

FIG. 5 shows a schematic diagram of handling the downlink NAS signaling after the UE enters RRC inactive state and DRX cycle is applied according to an embodiment of the present disclosure.

At 501, the AMF may determine to send an N1 NAS message to the UE, so it sends an N1 Message Transfer to the NG-RAN.

At 502, since the NG-RAN knows the UE is in eDRX cycle and based on the remaining unreachable time, the UE is not reachable before the NAS retransmission timer expires, the NG-RAN rejects the N1 Message Transfer, with a cause value indicating that the UE is temporarily not reachable. The NG-RAN may also include an Expected Waiting Time in the rejection message.

Based on implementation the AMF may buffer the N1 message and a further N1 message (step 503), or rejects the request which triggers the N1 message.

The AMF starts a timer according to the received Expected Waiting Time from NG-RAN at 504. Before the timer expires the AMF doesn't try to deliver any further N1 message to the NG-RAN.

At 505, if the UE has mobile originated uplink data or an uplink message within the eDRX cycle, the UE sends RRC Connection Resume request immediately to the NG-RAN to resume the RRC connection.

The NG-RAN sends an RRC Connection Resume to the UE at 506.

At 507, the UE sends an RRC Connection Resume Complete to the NG-RAN. After this step, the RRC connection between the UE and NG-RAN is resumed.

At 508, the NG-RAN sends an N2 Resume Request to the AMF to enable the N1 message transfer.

The AMF sends N2 Resume Request response to NG-RAN at 509.

The AMF sends the N1 message to the NG-RAN and the NG-RAN forwards the N1 message to the UE over the RRC connection at step 510.

Figure 6:
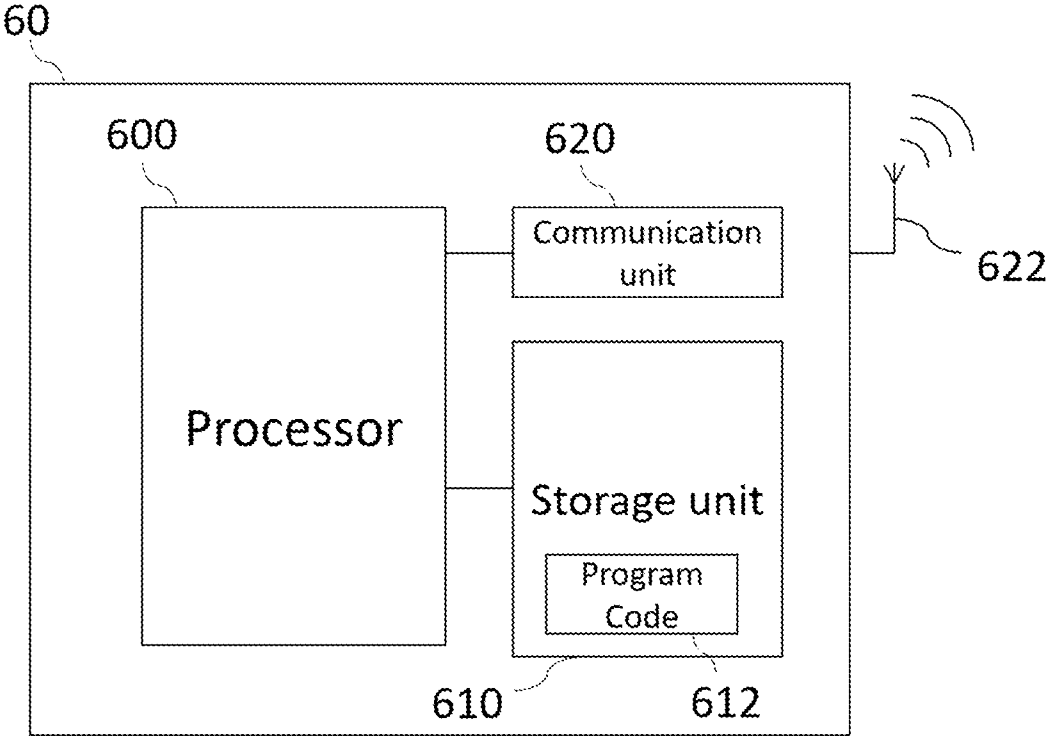
FIG. 6 shows an example of a schematic diagram of a wireless terminal according to an embodiment of the present disclosure.

FIG. 6 relates to a schematic diagram of a wireless terminal (or a wireless communication terminal) 60 according to an embodiment of the present disclosure. The wireless terminal 60 may be a user equipment (UE), a mobile phone, a laptop, a tablet computer, an electronic book or a portable computer system and is not limited herein. The wireless terminal 60 may include a processor 600 such as a microprocessor or Application Specific Integrated Circuit (ASIC), a storage unit 610 and a communication unit 620. The storage unit 610 may be any data storage device that stores a program code 612, which is accessed and executed by the processor 600. Embodiments of the storage unit 612 include but are not limited to a subscriber identity module (SIM), read-only memory (ROM), flash memory, random-access memory (RAM), hard-disk, and optical data storage device. The communication unit 620 may a transceiver and is used to transmit and receive signals (e.g., messages or packets) according to processing results of the processor 600. In an embodiment, the communication unit 620 transmits and receives the signals via at least one antenna 622 shown in FIG. 6.

In an embodiment, the storage unit 610 and the program code 612 may be omitted and the processor 600 may include a storage unit with stored program code.

The processor 600 may implement any one of the steps in exemplified embodiments on the wireless terminal 60, e.g., by executing the program code 612.

The communication unit 620 may be a transceiver. The communication unit 620 may as an alternative or in addition be combining a transmitting unit and a receiving unit configured to transmit and to receive, respectively, signals to and from a wireless network node (e.g., a base station).

FIG. 7 relates to a schematic diagram of a wireless network node (or a wireless communication node) 70 according to an embodiment of the present disclosure. The wireless network node 70 may be a satellite, a base station (BS), a network entity, a Mobility Management Entity (MME), Serving Gateway (S-GW), Packet Data Network (PDN) Gateway (P-GW), a radio access network (RAN) node, a next generation RAN (NG-RAN) node, a gNB, an eNB, a gNB central unit (gNB-CU), a gNB distributed unit (gNB-DU) a data network, a core network or a Radio Network Controller (RNC), and is not limited herein. In addition, the wireless network node 70 may comprise (perform) at least one network function such as an access and mobility management function (AMF), a session management function (SMF), a user place function (UPF), a policy control function (PCF), an application function (AF), etc. The wireless network node 70 may include a processor 700 such as a microprocessor or ASIC, a storage unit 710 and a communication unit 720. The storage unit 710 may be any data storage device that stores a program code 712, which is accessed and executed by the processor 700. Examples of the storage unit 712 include but are not limited to a SIM, ROM, flash memory, RAM, hard-disk, and optical data storage device. The communication unit 720 may be a transceiver and is used to transmit and receive signals (e.g., messages or packets) according to processing results of the processor 700. In an example, the communication unit 720 transmits and receives the signals via at least one antenna 722 shown in FIG. 7.

In an embodiment, the storage unit 710 and the program code 712 may be omitted. The processor 700 may include a storage unit with stored program code.

The processor 700 may implement any steps described in exemplified embodiments on the wireless network node 70, e.g., via executing the program code 712.

The communication unit 720 may be a transceiver. The communication unit 720 may as an alternative or in addition be combining a transmitting unit and a receiving unit configured to transmit and to receive, respectively, signals to and from a wireless terminal (e.g., a user equipment or another wireless network node).

FIG. 8 shows a flowchart of a wireless communication method according to an embodiment of the present disclosure. In an embodiment, the wireless communication method may be performed by a wireless communication node, such as the wireless network node 70 described above.

In an embodiment, the wireless communication method includes: receiving, by a wireless communication node (e.g., a gNB) from a user plane function, downlink data directed to a wireless communication terminal (e.g., a UE) during an unreachable time of the wireless communication terminal; and transmitting, by the wireless communication node to an access and mobility management function, a suspend request comprising a first indication to enable the downlink data to be buffered in the user plane function.

In an embodiment, the method may further comprises: receiving, by the wireless communication node, an extended discontinuous reception, eDRX, cycle value in a radio resource control, RRC, inactive state from the access and mobility management function; and setting, by the wireless communication node, the unreachable time of the wireless communication terminal according to the eDRX cycle value in the RRC inactive state.

Details of the wireless communication method can be ascertained by referring to the paragraphs above and will not be described herein.

FIG. 9 shows a flowchart of a wireless communication method according to an embodiment of the present disclosure. In an embodiment, the wireless communication method may be performed by an AMF or a device comprising an AMF, such as the wireless network node 70 described above.

In an embodiment, the wireless communication method includes: receiving, by an access and mobility management function from a wireless communication node (e.g., a gNB), a suspend request comprising a first indication to enable downlink data transmitted to a wireless communication terminal (e.g., a UE) to be buffered in the user plane function.

In an embodiment, the method may further comprises: transmitting, by the access and mobility management function to the wireless communication node, an extended discontinuous reception, eDRX, cycle value in a radio resource control, RRC, inactive state to allow the wireless communication node to set an unreachable time of the wireless communication terminal according to the eDRX cycle value in the RRC inactive state.

Details of the wireless communication method can be ascertained by referring to the paragraphs above and will not be described herein.

FIG. 10 shows a flowchart of a wireless communication method according to an embodiment of the present disclosure. In an embodiment, the wireless communication method may be performed by a wireless communication node, such as the wireless network node 70 described above.

In an embodiment, the wireless communication method includes: receiving, by a wireless communication node (e.g., a gNB) from an access and mobility management function, a request (e.g., the N1 Message Transfer described above) for transmitting a downlink non-access stratum, NAS, message to a wireless communication terminal (e.g., a UE) during an unreachable time of the wireless communication terminal; and transmitting, by the wireless communication node to the access and mobility management function, a reject message with a cause value indicating that the wireless communication terminal is temporarily unreachable.

In an embodiment, the method may further comprises: receiving, by the wireless communication node, an extended discontinuous reception, eDRX, cycle value in a radio resource control, RRC, inactive state from the access and mobility management function; and setting, by the wireless communication node, the unreachable time of the wireless communication terminal according to the eDRX cycle value in the RRC inactive state.

Details of the wireless communication method can be ascertained by referring to the paragraphs above and will not be described herein.

FIG. 11 shows a flowchart of a wireless communication method according to an embodiment of the present disclosure. In an embodiment, the wireless communication method may be performed by an AMF or a device comprising an AMF, such as the wireless network node 70 described above.

In an embodiment, the wireless communication method includes: transmitting, by an access and mobility management function to a wireless communication node (e.g., a gNB), a request (e.g., the N1 Message Transfer described above) for transmitting a downlink non-access stratum, NAS, message to a wireless communication terminal (e.g., a UE); and receiving, by the access and mobility management function from the wireless communication node, a reject message with a cause value indicating that the wireless communication terminal is temporarily unreachable.

In an embodiment, the method may further comprises: transmitting, by the access and mobility management function to the wireless communication node, an extended discontinuous reception, eDRX, cycle value in a radio resource control, RRC, inactive state to allow the wireless communication node to set an unreachable time of the wireless communication terminal according to the eDRX cycle value in the RRC inactive state.

Details of the wireless communication method can be ascertained by referring to the paragraphs above and will not be described herein.

Various embodiments are described below.

The NG-RAN releases the RRC connection with suspend, receives and buffers the downlink data from UPF, sends a suspend request to the AMF, including an indication to enable the downlink data buffering in UPF and keep the UE in connected state, and send a resume request to the AMF, including an indication to enable the downlink data transferring.

The AMF receives a suspend request from NG-RAN, including an indication to enable the downlink data buffering in UPF and keep the UE in connected state, keeps the UE in connected state, sends a message to the SMF to enable the downlink data buffering, receives resume from NG-RAN, and sends a message to the SMF to enable the downlink data transferring.

Moreover, the NG-RAN releases the RRC connection with suspend, receives the N1 message transfer from AMF, sends a reject message to the AMF including a cause value to indicate the UE is temporary unreachable, and an expected waiting time. It further receives the resume request from the UE, and sends the resume request to the AMF, indicating that the UE is reachable.

Moreover, the AMF sends an N1 message transfer to NG-RAN, receives a reject message including cause value to indicate the UE is temporary unreachable, and an expected waiting time, starts a timer based on an expected waiting time, and starts the N1 message transfer to NG-RAN when the timer expires or when it receives a resume request from the NG-RAN.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any one of the above-described example embodiments.

It is also understood that any reference to an element herein using a designation such as “first,” “second,” and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any one of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as “software” or a “software unit”), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term “configured to” or “configured for” as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term “unit” as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according to embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of the claims. Thus, the disclosure is not intended to be limited to the implementations shown herein, but is to be accorded the widest scope consistent with the novel features and principles disclosed herein, as recited in the claims below.

The invention claimed is:

1. A wireless communication method comprising:

receiving, by a wireless communication node from a user plane function in a core network, downlink data directed to a wireless communication terminal during an unreachable time of the wireless communication terminal; and transmitting, by the wireless communication node to an access and mobility management function, a suspend request comprising a first indication to enable the downlink data to be buffered in the user plane function in the core network, wherein the suspend request requests the access and mobility management function to keep the wireless communication terminal in a connection management (CM) CONNECTED state.

2. The wireless communication method of claim 1, comprising:

receiving, by the wireless communication node, an extended discontinuous reception (eDRX) cycle value in a radio resource control (RRC) inactive state from the access and mobility management function; and setting, by the wireless communication node, the unreachable time of the wireless communication terminal according to the eDRX cycle value in the RRC inactive state.

3. The wireless communication method of claim 1, comprising:

buffering, by the wireless communication node, the downlink data in the wireless communication node.

4. The wireless communication method of claim 1, comprising:

transmitting, by the wireless communication node to the wireless communication terminal, the downlink data that is buffered in the user plane function in response to the wireless communication terminal resuming from an eDRX idle state.

5. The wireless communication method of claim 1, comprising:

transmitting, by the wireless communication node to the access and mobility management function, a resume request comprising a second indication to enable a transferring of the downlink data over an interface between the user plane function and the wireless communication node.

6. A wireless communication method comprising:

receiving, by an access and mobility management function from a wireless communication node, a suspend request comprising a first indication to enable downlink data transmitted to a wireless communication terminal to be buffered in a user plane function in a core network during an unreachable time of the wireless communication terminal, wherein the suspend request requests the access and mobility management function to keep the wireless communication terminal in a connection management (CM) CONNECTED state.

7. The wireless communication method of claim 6, comprising:

transmitting, by the access and mobility management function to the wireless communication node, an extended discontinuous reception (eDRX) cycle value in a radio resource control (RRC) inactive state to allow the wireless communication node to set the unreachable time of the wireless communication terminal according to the eDRX cycle value in the RRC inactive state.

8. The wireless communication method of claim 6, comprising:

transmitting, by the access and mobility management function to a session management function, a request for enabling the downlink data to be buffered in the user plane function in the core network in response to the first indication.

9. The wireless communication method of claim 6, comprising:

receiving, by the access and mobility management function from the wireless communication node, a resume request comprising a second indication to enable a transferring of the downlink data over an interface between the user plane function and the wireless communication node.

10. The wireless communication method of claim 9, comprising:

transmitting, by the access and mobility management function to a session management function, a request for enabling the transferring of the downlink data in response to the second indication.

11. A wireless communication node, comprising:

a communication unit; and a processor configured to:

receive, via the communication unit from a user plane function in a core network, downlink data directed to a wireless communication terminal during an unreachable time of the wireless communication terminal; and transmit, via the communication unit to an access and mobility management function, a suspend request comprising a first indication to enable the downlink data to be buffered in the user plane function in the core network, wherein the suspend request requests the access and mobility management function to keep the wireless communication terminal in a connection management (CM) CONNECTED state.

12. The wireless communication node of claim 11, wherein the processor is further configured to:

receive, via the communication unit, an extended discontinuous reception (eDRX) cycle value in a radio resource control (RRC) inactive state from the access and mobility management function;

set the unreachable time of the wireless communication terminal according to the eDRX cycle value in the RRC inactive state; and buffer the downlink data in the wireless communication node.

13. The wireless communication node of claim 11, wherein the processor is further configured to:

transmit, via the communication unit, to the wireless communication terminal, the downlink data that is buffered in the user plane function in response to the wireless communication terminal resuming from an eDRX idle state; and transmit, via the communication unit, to the access and mobility management function, a resume request comprising a second indication to enable a transferring of the downlink data over an interface between the user plane function and the wireless communication node.

14. An access and mobility management function (AMF) comprising:

a communication unit; and a processor configured to:

receive, via the communication unit from a wireless communication node, a suspend request comprising a first indication to enable downlink data transmitted to a wireless communication terminal to be buffered in a user plane function in a core network during an unreachable time of the wireless communication terminal, wherein the suspend request requests the access and mobility management function to keep the wireless communication terminal in a connection management (CM) CONNECTED state.

15. The AMF of claim 14, wherein the processor is further configured:

transmit, via the communication unit, to the wireless communication node an extended discontinuous reception (eDRX) cycle value in a radio resource control (RRC) inactive state to allow the wireless communication node to set the unreachable time of the wireless communication terminal according to the eDRX cycle value in the RRC inactive state; and transmit, via the communication unit, to a session management function a request for enabling the downlink data to be buffered in the user plane function in the core network in response to the first indication.

16. The AMF of claim 14, wherein the processor is further configured to:

receive, via the communication unit from the wireless communication node, a resume request comprising a second indication to enable a transferring of the downlink data over an interface between the user plane function and the wireless communication node; and transmit, via the communication unit to a session management function, a request for enabling the transferring of the downlink data in response to the second indication.

* * * * *